United States Patent Office

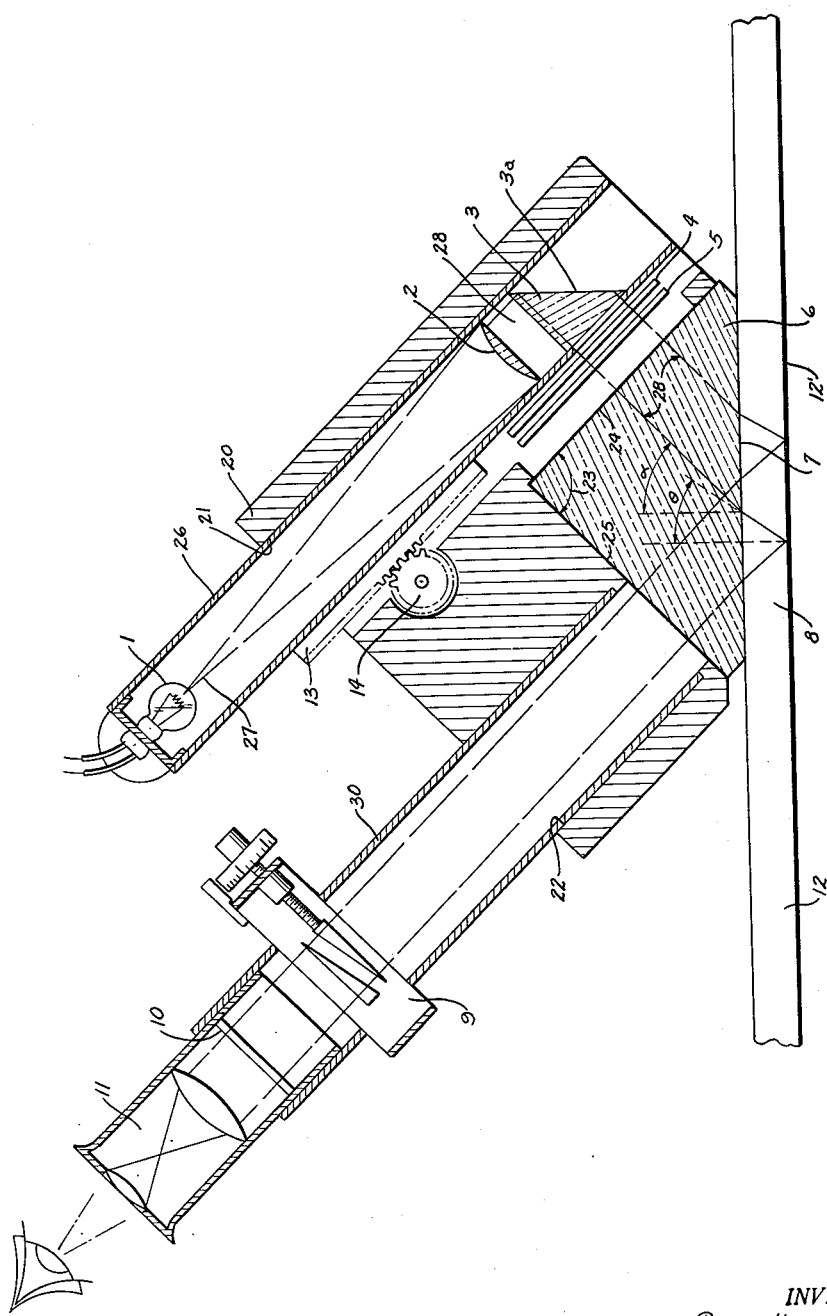

2,995,060
Patented Aug. 8, 1961

1

2,995,060
APPARATUS FOR THE OPTICAL DETERMINATION OF STRESSES
Paul Henri Acloque, Paris, France, assignor to Compagnie de Saint-Gobain, Paris, France
Filed Nov. 28, 1955, Ser. No. 549,527
Claims priority, application France Nov. 27, 1954
16 Claims. (Cl. 88—14)

This invention relates to an optical apparatus adapted for measuring stresses in a sheet or plate of transparent material, capable of becoming anisotropic under the influence of these stresses, the system of said stresses being two-dimensional and parallel to the faces of the sheet or plate.

When glass is given certain treatments such as tempering, it may become birefringent, and the degree of birefringence is a function of the magnitude of the stresses within it; in case of differential tempering or of non-uniform cooling, the stresses can be measured by the apparatus of this invention.

The apparatus according to the invention comprises a device emitting polarized light located so that the incident light beam is slanted onto the first face of the plate and that the angle of incidence is susceptible of taking an arbitrary but known value while the plane of polarization of the incident light is slanted onto the plane of incidence, and also a receiving device located so as being able to receive emerging light, either after a single travel through the plate or after two travels in the case of reflection on the second face, the receiving device including a birefringence measuring device and an analyser.

Within the scope of the invention, the apparatus may also embody an intermediary device for giving to the light beam inside of the plate a predetermined direction.

It may equally include a connecting device between the emitting device and the receiving device for centering the beam they have to emit and receive.

As the principles of the invention will be better comprehended after a study of an apparatus which carries them out, we will first discuss the apparatus shown in the drawing.

The following description and the accompanying drawing illustrate by way of example an apparatus for carrying out the invention in which the light coming out of the emitting device is reflected on the second face of the plate or sheet.

Referring now to the drawing: The apparatus includes a housing 20 and two barrels 21—22 with axes parallel in the example. The frame 20 is cut between the two barrels to an angle 23 which may be advantageously 90°, the side 24 of the angle being parallel to the axis of the barrel 21 and the side 25 exactly perpendicular to the axis of the barrel 22. Into this angle 23 is fitted a prism 6 which has a face 7 adapted to make optical contact with the upper surface 7 of the test piece 12, which is assumed to be glass for the purpose of this description. The attaining of optical contact may be assured by the use of a liquid between the faces of prism 6 and plate 12.

The barrel 21 contains a slidably mounted tube 26 which carries a rack 13 which is engaged with a pinion gear 14 rotatably mounted in the frame and operated by a finger knob not shown. Mounted in the end of a tube is a punctual source of light which may be advantageously the filament of a low tension electric bulb 1 which projects its rays 27 toward a collimating lens 2, the beam 28 from which is composed of parallel rays which enter a prism 3, which is mounted in a tube with lens 2 and which has a totally reflective surface 3a which directs the beam 28 through a filter 4 which can make the light monochromatic, and a polarizer 5, from which it enters the prism 6. The angle at which the rays enter the prism is shown as 90°, but it can be varied by substituting a prism 3 which has acute angles of chosen degree. The beam 28' is therefore polarized and monochromatic. Preferably the prism 6 has the same index of refraction as the material 12 which is being studied, but it may be different. By rotating gear 14, the tube 26 can be moved in the barrel 21 and the beam 28' can be made to emerge from places of different height.

The beam 28' is refracted at the surface 7, as shown, reflected at least in part from the lower surface 12' and then refracted again at the surface 7 and travels along the tube 30 which is mounted in the barrel 22. The tube 30 contains apparatus for measuring birefringence such as a Babinet compensator 9, a sensitive pink plate or fullwave plate etc., from which the rays pass through an analyzer 10 into an eye-piece 11 having two lenses. For example. By adjusting the tube 26, the path of the beam through tube 30 can be made to coincide with the axis of that tube.

The emergent beam can be directed so as to penetrate into the receiving device following its optical axis, regardless of changes in thickness from sample to sample, by suitable adjustment of gear 14.

The path followed by the light beam in the different parts of this apparatus is visible in the drawing. The light emitted by luminous light source, which is virtually a point source of light, is received by the collimator lens 2 from which it emerges as a beam 28, the parallel rays of which are totally reflected on face 3a of prism 3, and enter the refractive piece 6 after passing through the polarizer 5 through which it travels until it engages in plate 12 at face 7, making an angle alpha with the perpendicular to that face. The angle remains the same whatever may be the position of the rack bar 13. The rays leaving the refractive piece 6 penetrate the plate 12 in a direction which may be the same as or different from that which it had in piece 6, depending upon whether the indexes of refraction of the two pieces are the same. The direction of the ray against the second face of the plate 12 is measured by the angle theta, which is dependent on the angle alpha. On the lower face 12' of the test piece 12 the light is totally or partly reflected, depending upon the value of angle theta, and that part which is reflected again enters the refractive piece 6 following a path symmetrical with that of entry and emerges thence into the tube 30, passing to the elements 9, 10 and 11.

It will thus be seen that the apparatus includes means to emit polarized light, herein termed an "emitter device," and that this means is so disposed that the incidence of the beam shall be oblique to the upper face of the test piece and that the angle of incidence will be known but arbitrary, while the plane of polarization of the light issuing from the polarizing source is inclined to the plane of incidence. The apparatus also includes a measuring section so placed that it receives the beam emerging from the test piece either after a single passage through the piece or after a double passage, in the case of reflection from the lower (second) face of the test piece. This measuring section contains means for measuring birefringence, and an analyzer.

In accordance with the invention the apparatus may be used to give the light beam any desired inclination or direction within the test piece. A device permits the proper alignment of the beam along the analyzer tube.

It has been found that this apparatus enables an operator to determine, at any point of a stressed sheet or plate, even if the stress is of revolution about an axis perpendicular to the faces, by means of one or two readings, the distinct value of each one of the rectangular stresses $p$ and $q$ which are the principal stresses at this point.

It is known that the usual polariscopic observation which, in two-dimensional photoelasticimetry, is made perpendicular to the faces of the samples gives directly only the difference $(p-q)$ between the principal stresses.

With the apparatus according to the invention, the observation of the emergent light, along a direction making an angle $\theta$ with the perpendicular to the faces, enables the operator to observe and measure a birefringence which can be related to individual values of the principal stresses. In the general case where the values of these principal stresses are not identical, two separate readings in the two incidence planes coinciding respectively with each of the principal planes give the values $d1$ and $d2$ of the birefringence from which the value of $p$ and $q$ may be obtained by using the simple equations below:

$$p = a(d1 + d2 \cos^2\theta)$$
$$q = a(d2 + d1 \cos^2\theta)$$

$a$ is a constant depending on the apparatus, on the nature and on the thickness of the material in which the stresses are determined. This constant is determined once for all, either by computation or by calibration on a sample of the same substance and the same thickness stressed in a known manner.

The greater is angle $\theta$, the greater is the sensitiveness of the measurement, since the length of the path followed by the polarized light within the sample varies in the same direction as this angle. The choice of the value of the angle is however limited by the fact that the volume of the plate with which the experiment is concerned must not be greater than that in which the stresses can be assumed to be equal from one point to the other. The size of the angle will be chosen depending on the gradient of the stresses. A 45° angle can be used generally with convenience because of the very simple value of $\cos^2\theta$ in the above equation which then becomes:

$$p_{45} = a(d_1 + 0.5\, d_2)$$
$$q_{45} = a(d_2 + 0.5\, d_1)$$

When the stress is the same in any direction, it may be convenient to take an angle slightly different from 45°.

The value of $\theta$ may be conveniently modified by choosing an intermediate refringent device whose refractive index is in a suitable ratio with that of the sample to be investigated. With the setting shown in the drawing and corresponding to an angle $\alpha$ equal to 45°, if the investigated sample has like the refringent device an index equal to 1.525 (glass plate), the angle obtained finally will be 45° also.

An apparatus in which the measurement is made by reflection of the light on the second face of the sheet has been described so far, but the apparatus can be arranged, as specified above, so that the reading is made only on the beam coming out of the sheet through the second face. In this apparatus, the intermediate refringent device is made of two parts so that the beam can be received in the analyzing device located on the other side of the glass plate investigated.

*Example of a calibration of the apparatus*

The calibration of an apparatus according to the invention set so that the incidence angle $\alpha$ is equal to 45° and utilizing a glass refringent device of 1.525 refractive index has been carried out on a rectangular glass sample (refractive index 1.525), 6.2 mm. thick, 40 mm. wide and 70 mm. long. This glass sample was submitted to a uniform compression parallel to its greater dimension, by means of a special screw press. The amount of compression is determined by known means, as explained below.

The usual polariscopic observation carried out perpendicularly to the faces of the sample has disclosed a negative birefringence of 0.87 wave length of the medium yellow ($\lambda = 565$ millimicrons), that is 793 millimicrons per cm. Since the stress is unidirectional, the component $q$ is null and the birefringence is entirely caused by $p$. The photoelastic constant of plate glass being approximately 2.5 brewsters, the stress is therefore a compression equal to 317 kg./cm.$^2$.

The apparatus according to the invention, located so that the incidence plane is perpendicular to the principal plane containing the stress $p$, has disclosed a negative birefringence $d_1 = 2.50$ millimicrons per cm. The incidence plane is then located parallel to the principal plane containing the stress $p$, a positive birefringence is then measured $d_2 = 1.231$ wave length, i.e. 1105 millimicrons per centimeter.

By using then the above equations, it is found:

$$p = a(2280 - 553)$$
$$q = a(1105 - 1140)$$

$q$ may therefore be taken as null, since the spread of 35 millimicrons per cm is of the order of magnitude of the irregularities in the annealed glass used as sample.

From the first equation, $a$ is then obtained by replacing $p$ by the value 317 kg./cm.$^2$ found above.

With this apparatus, and by making a measurement on plate glass with a thickness of 6.2 mm., the coefficient $a$ being taken equal to 0.185, the stresses are then directly expressed in kg./cm.$^2$.

In the above description, the emitting device produces a plane polarized light. It is obvious that circularly polarized light may also be used.

As many apparently widely different embodiments of the present invention may be made without departing from the spirit and scope thereof, it is to be understood that the invention is not limited to the specific embodiments.

What is claimed is:

1. Apparatus using polarized light for measuring internal strains and birefringences in a plate of transparent material, which is adapted for measuring the separate values of the principal strains by two successive observations effected in one of the principal planes and in the second principal plane after a simple relative rotation between the apparatus and the plate about the perpendicular to the plate at the observed point, without modifying the angle of incidence of the polarized light on the plate, said apparatus comprising an emitter device receiving light from a light source and including a collimator and a polarizer giving a polarized parallel beam of light having its plane of polarization inclined with respect to the plane of incidence of the light on the plate to be examined, a receiver device including an analyzer and a means for measuring birefringences, means rigidly connecting the receiver device, the emitter device and another means assuring the continuity of the optical path from the emitter to the plate and thence to the receiver and comprising a transparent refringent body adapted to make optical contact with the first face of the plate and to enable the light beam from the emitter to pass through the first face of the plate, without deviation and partial reflection, and to penetrate obliquely into the plate at a predetermined angle with respect to the normal to the plate, to cause the angle in the interior of the plate between the incident beam and the normal to the second face of the plate to be greater than the critical angle of the plate with respect to air, and to allow the beam of light reflected by the second face of the plate to be received at the same angle through the receiver device.

2. Apparatus according to claim 1 in which the emitter device includes said source of light.

3. Apparatus according to claim 1 in which the emitter device includes a light filter.

4. Apparatus according to claim 1 in which the emitter device includes an optical means for deflecting the light beam.

5. Apparatus according to claim 4 in which the light beam is deflected by a totally reflecting prism.

6. Apparatus according to claim 5 in which the optical axis of the emitter device is parallel to the optical axis of the receiver device.

7. Apparatus according to claim 1 in which means are provided to move the emitter device parallely to its optical axis.

8. Apparatus according to claim 1 in which the transparent refringent body is a rectangular prism.

9. Apparatus according to claim 1 in which a liquid having a convenient index of refraction is interposed between the transparent refringent body and the plate.

10. Apparatus according to claim 1 in which the receiver device comprises a birefringence compensating optical means.

11. Apparatus using polarized light for measuring internal strains and birefringences in a plate of transparent material which is adapted for measuring the separate values of the principal strains by two successive observations effected in one of the principal planes and in the second principal plane after a simple relative rotation between the apparatus and the plate about the perpendicular to the plate at the observed point without modifying the angle of incidence of the polarized light on the plate, said apparatus comprising an emitter device receiving light from a light source and including a collimator and a polarizer giving a circularly polarized light beam, a receiver device including a circular light analyzer and a means for measuring birefringences, means rigidly connecting the receiver device, the emitter device and another means assuring the continuity of the optical path from the emitter to the plate and thence to the receiver and comprising a transparent refringent body adapted to make optical contact with the first face of the plate and to enable the light beam from the emitter to pass through the first face of the plate, without deviation and partial reflection, and to penetrate obliquely into the plate at a predetermined angle with respect to the normal to the plate, to cause the angle in the interior of the plate between the incident beam and the normal to the second face of the plate to be greater than the critical angle of the plate with respect to air, and to allow the beam of light reflected by the second face of the plate to be received at the same angle through the receiver device.

12. Apparatus according to claim 11 in which the emitter includes a polarizer associated with a quarter wave plate and the receiver includes an analyzer associated with a quarter wave plate.

13. Apparatus using polarized light for measuring internal strains and birefringences in a plate of transparent material, which is adapted for measuring the separate values of the principal strains by two successive observations effected in one of the principal planes and in the second principal plane after a simple relative rotation between the apparatus and the plate about the perpendicular to the plate at the observed point, without modifying the angle of incidence of the polarized light on the plate, said apparatus comprising an emitter device receiving light from a light source and including a collimator and a polarizer giving a polarized light beam having its plane of polarization inclined with respect to the plane of incidence of the light on the plate to be examined, a receiver device including an analyzer and a means for measuring birefringences, means rigidly connecting the receiver device, the emitter device and a transparent refringent body adapted to make an optical contact with the first face of the plate and to enable the light beam from the emitter to pass through the first face of the plate without deviation and partial reflection, and to penetrate obliquely into the plate at a predetermined angle with respect to the normal to the plate.

14. Apparatus using polarized light for measuring internal strains and birefringences in a plate of transparent material, which is adapted for measuring the separate values of the principal strains by two successive observations effected in one of the principal planes and in the second principal plane after a simple relative rotation between the apparatus and the plate about the perpendicular to the plate at the observed point, without modifying the angle of incidence of the polarized light on the plate, said apparatus comprising an emitter device receiving light from a light source and including a collimator and a polarizer giving a polarized parallel beam of light having its plane of polarization inclined with respect to the plane of incidence of the light on the plate to be examined and an optical means for deflecting the light beam, a receiver device parallel to the emitter device including an analyzer and a means for measuring birefringences, means rigidly connecting the receiver device, the emitter device and another means assuring the continuity of the optical path from the emitter to the plate and thence to the receiver and comprising a rectangular prism adapted to make optical contact with the first face of the plate and to enable the light beam from the emitter to pass through the first face of the plate, without deviation and partial reflection, and to penetrate obliquely into the plate at a predetermined angle with respect to the normal to the plate, to cause the angle in the interior of the plate between the incident beam and the normal to the second face of the plate to be greater than the critical angle of the plate with respect to air, and to allow the beam of light reflected by the second face of the plate to be received at the same angle through the receiver device.

15. Apparatus according to claim 14 in which means are provided to move the emitter device parallel to its longitudinal axis.

16. Apparatus using polarized light for measuring internal strains and birefringences in a transparent article having substantially parallel first and second faces at at least one zone thereof, which is adapted for measuring the separate values of the principal strains at said zone by two successive observations effected in one of the principal planes and in the second principal plane after a simple relative rotation between the apparatus and the article at the observed point in said zone, without modifying the angle of incidence of the polarized light on the article, said apparatus comprising a polarized light emitter device receiving light from a light source and including a collimator receiving light from the light source and giving an emergent beam of parallel rays, and a polarizer in said emergent beam of parallel rays passing a beam of polarized light having its plane of polarization inclined with respect to the plane of incidence of the light on the article to be examined, a receiver device including an analyzer and a means for measuring birefringences, means rigidly connecting the receiver device, the emitter device and a transparent refringent body adapted to make an optical contact and to enable the light beam from the emitter to pass through the first face of the article without deviation and partial reflection, and to penetrate obliquely through the first face of the article at a predetermined angle with respect to the normal to the first face of the article.

References Cited in the file of this patent

UNITED STATES PATENTS

| Number | Name | Date |
|---|---|---|
| 1,875,665 | Schweizer | Sept. 6, 1932 |
| 2,119,577 | Gray | June 7, 1938 |
| 2,239,263 | Waine et al. | Apr. 22, 1941 |
| 2,457,799 | Altenberg | Jan. 4, 1949 |
| 2,460,515 | Lowber et al. | Feb. 1, 1949 |

(Other references on following page)

FOREIGN PATENTS 378,833 Germany _____ Aug. 3, 1923

OTHER REFERENCES

Mindlin article in Journal of Applied Physics, vol. 10, 1939, pages 229, 237.

Frocht: "Photoelasticity," 1941, John Wiley & Sons, Inc., New York (pages 163–166, and 382–386).

Read article in Journal of Applied Physics, vol. 21, 1950, pages 250–257.

Jenkins et al.: "Fundamentals of Optics," 2nd edition, 1950, McGraw-Hill, New York (pages 532–534).